United States Patent
Huang et al.

(10) Patent No.: US 7,478,782 B2
(45) Date of Patent: Jan. 20, 2009

(54) SYSTEM AND METHOD INCORPORATING ADAPTIVE AND RECONFIGURABLE CELLS

(75) Inventors: James P. Huang, Hungtington Beach, CA (US); Peter A. HoSang, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 891 days.

(21) Appl. No.: 10/990,169

(22) Filed: Nov. 16, 2004

(65) Prior Publication Data

US 2006/0105706 A1    May 18, 2006

(51) Int. Cl.
*B64G 1/10* (2006.01)
(52) U.S. Cl. .................. 244/158.1; 244/159.4
(58) Field of Classification Search .............. 244/158.1, 244/159.4, 159.5, 172.7; 701/13; 439/78
See application file for complete search history.

(56) References Cited

U.S. PATENT DOCUMENTS

| | | | | |
|---|---|---|---|---|
| 5,052,640 | A * | 10/1991 | Chang | 244/172.7 |
| 5,527,001 | A * | 6/1996 | Stuart | 244/159.4 |
| 6,568,638 | B1 * | 5/2003 | Capots | 244/159.4 |
| 6,617,505 | B2 * | 9/2003 | Shimada | 136/244 |

* cited by examiner

*Primary Examiner*—Rob Swiatek
(74) *Attorney, Agent, or Firm*—Evan Law Group LLC (57) ABSTRACT

A system and method by which specialized components (tenants) are mounted to an assembly comprising a plurality of modular units. Each modular unit has one or more interface connecting locations for one or more of a power connection, a thermal connection and data base connection, along with one or more of power, thermal and data transmission paths. Modular units can be united in an assembly, and at least some of the modular units have a switching system to selectively transmit and/or receive one or more of power, thermal and data transmissions.

19 Claims, 8 Drawing Sheets

SYSTEM AND METHOD INCORPORATING ADAPTIVE AND RECONFIGURABLE CELLS

BACKGROUND OF THE INVENTION a) Field of the Invention

The present invention relates to operating systems and methods where there are specialized components or functions which vary from one system to another, depending on the tasks to be performed, and there are other more standard components or functions which would be common to various forms to the operating system, and more particularly to operating systems of spacecraft or satellites where there are a variety of functions depending upon the mission to be accomplished and other factors.

b) Background Art

Satellites, spacecrafts and the like are utilized for a variety of tasks or missions. Accordingly, current satellite design approaches are unique to the mission, and also unique to the payload which is to be carried into outer space or it's other location of use. Each satellite is custom tailored and optimized for a particular mission or payload. The satellite subsystems/components are usually providing a single spacecraft housekeeping functions (e.g. power, thermal, structural, mechanical, telemetry, tracking and control, satellite processing, command and control, attitude determination, control, navigation, etc.), and specific payload functions (e.g. communications, surveillance, etc.). Therefore, if there is a design of a satellite for one mission, and if this same type of design is to be adapted to accomplish some other different mission, the changing of any part or parts of the design or subsystem generally requires significant rework of the system. This customizing of each design translates into engineering efforts needed to modify existing design, change drawings, re-manufacture parts, re-test and other related activities. For example, specific design solutions are required to ensure equipment is properly wired, powered, structurally supported and thermally managed.

It is to these types of challenges that the embodiments of the present invention are directed.

DESCRIPTION OF THE PREFERRED EMBODIMENTS

Figure 1:
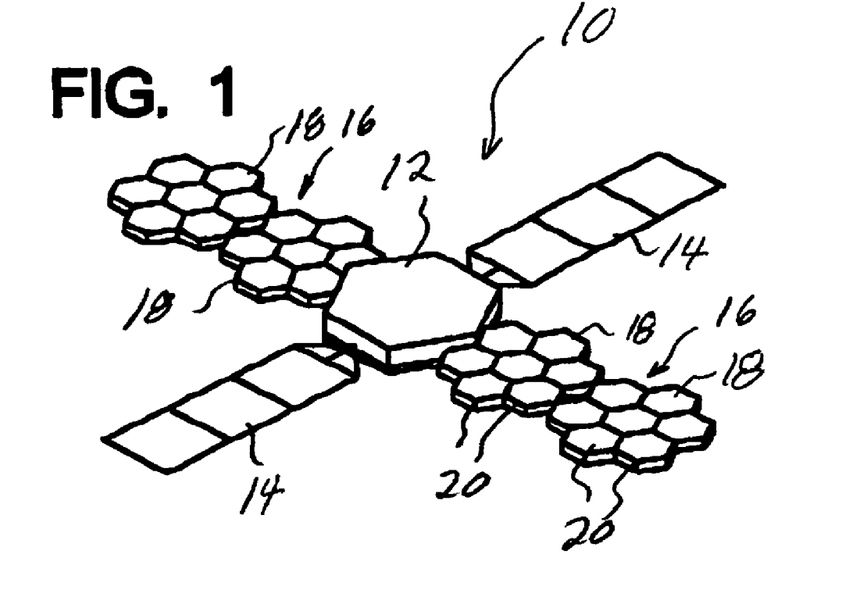
FIG. 1 is an isometric view of a satellite in its deployed position, including ARC units (i.e. adaptive and reconfigurable cells) of embodiments of the present invention.

It is believed that a better understanding of the embodiments of the present invention will be obtained by preceding a detailed description of these embodiments with a brief description of a satellite design in which the embodiments of the present invention could be incorporated. Reference is first made to FIG. 1 which is a somewhat schematic drawing of such a space satellite 10 in it's deployed position in space.

This space satellite 10 comprises a central component 12 to which are attached two solar panels 14 which extend radially outwardly from the central component 12 in diametrically opposed directions. There are also two sets 16 of module assemblies 18 also attached to and extending radially outwardly from the central component 12, with each module assembly 18 being made up of a plurality of modular units 22, each of which is termed an "ARC unit" 22. The terms "ARC" is an acronym for "adaptive and reconfigurable cell". To provide an explanation of the use of the word "reconfigurable", it can be seen in FIG. 1 that each of the ARC units 22 has the overall configuration of a regular polygon (in this embodiment a hexagon), with these units 22 being of the same size and shape. Thus, with patterns of uniform geometric configurations, these various modular units 22 can be interchanged and/or reconfigured.

To provide an explanation for the term "adaptive", it should first be pointed out that the basic design of these ARC units 22 is basically uniform so that each ARC unit 22 is able to provide similar functions for the various tenants for which it is a host. The term "tenant" is used to refer to various more specialized components that can be physically and functionally attached (or mounted) to an ARC unit 22 which then functions as the "host". By having the design of the ARC units 22 standardized, cost and schedule savings are achieved in a number of ways. The same building block, i.e. the ARC unit 22, can be produced in large quantities and is arranged so that it can be used in the construction of satellites that have different specialized components (i.e. tenants) for various missions. Yet the design of each ARC unit 22 is adaptable so that it can be utilized as a host for a wide variety of tenants in the satellite for various functions in different missions, and also so that the configuration can be optimized.

Each of the ARC units is a structure unit that is able to be connected to another ARC unit to form a structure assembly.

Figure 2:
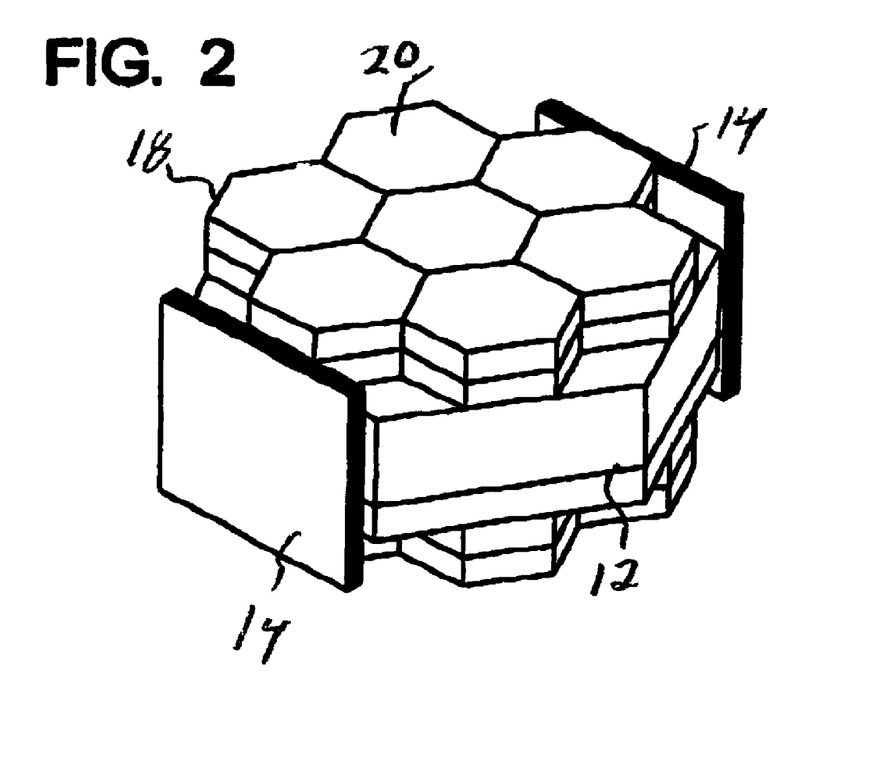
FIG. 2 is an isometric view drawn to an enlarged scale relative to FIG. 1, showing the satellite in FIG. 1 in its stowed position or in its stowed pre-launch position.

The ways that the ARC assemblies can be assembled can vary. For example, the basic arrangement of the ARC units 22 could be pre-assembled on the ground, and then placed in a collapsed launch position, as shown in FIG. 2, to be carried into outer space. Then the pre-launch package shown in FIG. 2 can be rearranged into its deployed operating position as shown in FIG. 1.

To give an introductory explanation of the design and functions of the ARC units 22, the structure is provided with embedded thermal paths (e.g. heat pipes), power lines, and data (including both digital and analog signals) wiring harness. The inner connectivity of these embedded infrastructures within the ARC unit 22 and between the various ARC units 22 are fully programmable and may be controlled through field programmable gate arrays (FPGA) and/or various switches such as solid state, thermal and Micro-Electro Mechanical System (MEMS) switches. The field programmable gate array (FPGA) may in turn controlled by the embedded processor which is the brain of the ARC unit 22 with memory blocks, NANO scale sensors, and wireless communication interface. Each ARC unit 22 may be built with embedded health management capability. A set of nano and/or micro scale sensors for light, thermal, nuclear, vibration, pressure and stress may also be embedded to enable each ARC unit 22 to be fully capable of monitoring the operating environment. Together with health management and nano and/or sensor feedback, the ARC unit 22 can adapt to a changing environment, internally or externally, and maximize mission availability and performance.

Figure 3:
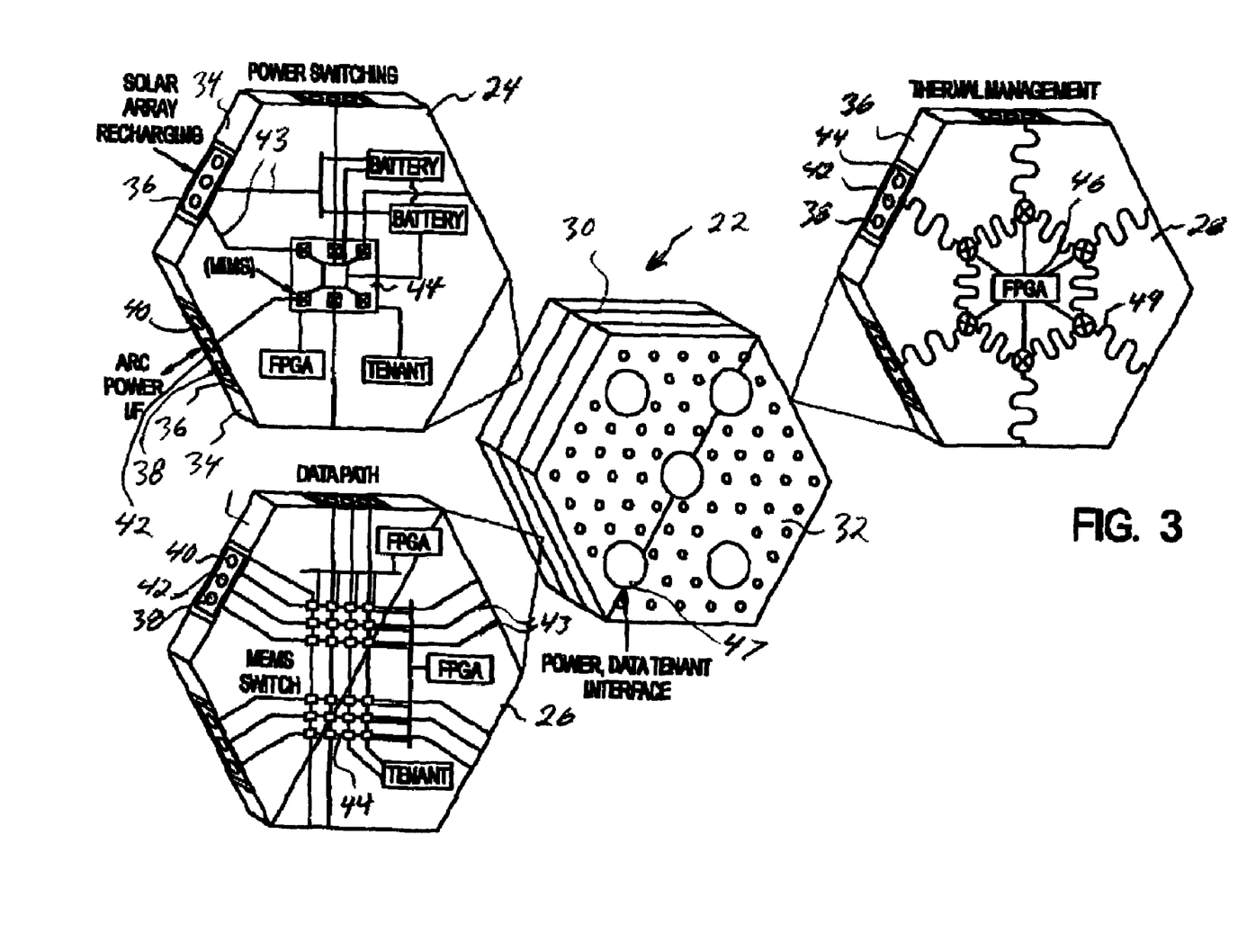
FIG. 3 is an isometric view, showing three major subsections of a single ARC unit, with each section being shown separately, and also shown stacked one on the other as an ARC unit in the central portion of FIG. 3.

To describe the ARC unit 22 in more detail, reference is made to the semi-schematic drawing of FIG. 3. The ARC unit 22 is illustrated as having three subsections, namely a power switching subsection 24, a data path subsection 26 and a thermal management subsection 28. Each of these subsections 24, 26 and 28 are of the same size, with the same configuration of a regular hexagon, and are shown for purposes of illustration as being separated from one another and also as being stacked and interconnected one on top of the other to form the operating ARC unit 22. Thus, the ARC unit 22, comprising the three assembled subsections 24, 26 and 28, has six perimeter side surfaces 30 and a front interface surface 32 which in this particular arrangement is the exposed surface of the thermal management subsection 28.

To describe now the power switching subsection 24, there are six interface surface regions 34 at each perimeter side surface 30, each of which has an interface connecting location 36. Each interface connecting location 36 has a power connector 38, a data path connector 40 and a thermal connector 42, with each of these connectors 38, 40 and 42 being transmitting/receiving connections, and conduits, lines or paths 43 within the ARC units 22 to make connections between related connectors in the same ARC unit. These lines or conduits 43 will in the following text be referred to as a "conduit" which is meant to be used in a broader sense to indicate the various lines, paths or other means by which functional transmissions can be carried out. While only three of the interface connecting locations 36 are shown in FIG. 3, it is to be understood that these may exist at all six of the side surface interface regions 34.

The power switching subsection 24 has a switching section 44 which in this embodiment is a micro-electro mechanical system switch (MEMS), and this has the ability to make operative connections to each of the connections in each of the connecting locations 36 in the power switching subsection 24. Alternatively, the switching function could be accomplished by a solid state switch or other type of switch. As shown in FIG. 3 one connecting location 36 is shown as connecting to a solar array recharging section of the satellite 10, and another connecting location 36 has a power connection. Other connections can be made with another power source/user or to a tenant which is mounted to the ARC unit 22. There is in the power switching subsection 24 a field programmable gate array (FPGA) that controls the operation of the switching section 44.

The data path subsection 26 has interface connecting locations and connectors the same as, or substantially the same as, those of the power switching section 24, and these are given several like numerical designations, namely, the interface connecting locations 36, with the connectors being the power connector 38, the data path connector 40 and the thermal connector 42. There is also a switching section 44 in the data path section 26 and the various switching locations are indicated by a matrix of twenty four locations indicated by small rectangles. By opening and closing individual switch components at those various switching locations, the various data paths through the conduits 43 to the power connections at 38, 40 and 42 can be controlled.

The thermal management subsection 28 has substantially the same physical configuration and side surface regions 34, interface connecting locations 36 and connectors 38, 40 and 42 as in the power switching subsection 24 and the data path subsection 26, so these will not be discussed relative to the thermal management section 28. There is a field programmable gate array 46 (FPGA) which controls the transmission through the conduits 49 to the various connectors 38, 40 and 42 at the interface connecting locations 36.

Thus, it can be seen that the various connecting locations 36 of each of the subsections 24, 26 and 28 can transmit/receive relative to other connecting locations 38, 40 and 42 at other connecting locations 36 within the same ARC unit 22 and also to other connecting locations in other ARC units. Also, with further reference to FIG. 3, there is a power, data tenant interface 47 at the front tenant interface surface 32, as well as other tenant interface locations.

Figure 4:
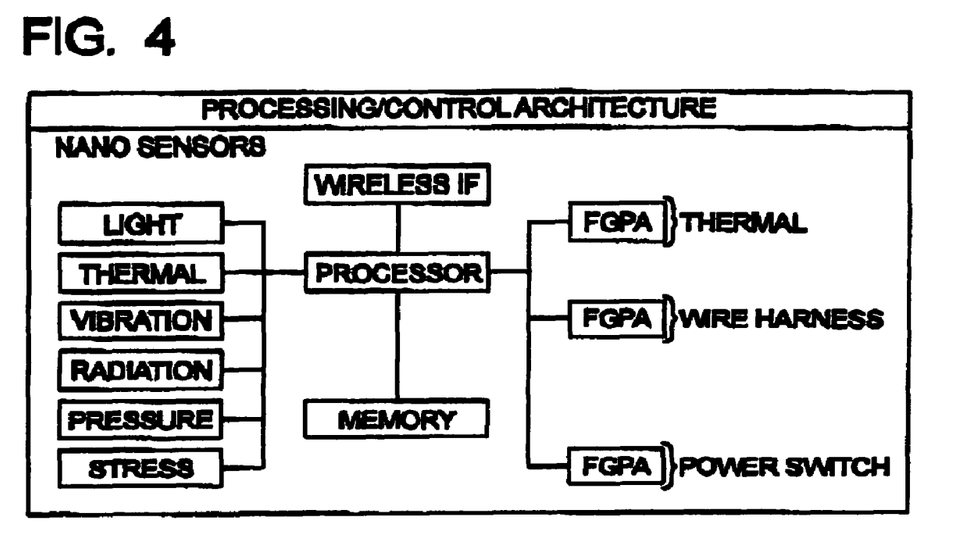
FIG. 4 is a schematic presentation of processing control architecture of an ARC unit.

FIG. 4 is a schematic drawing illustrating the basic processing/control architecture of the ARC unit 22.

Figure 5:
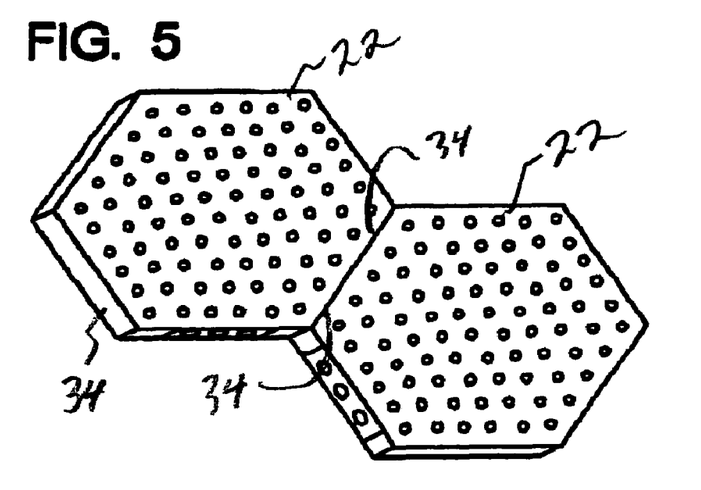
FIG. 5 is an isometric view showing two of the ARC units joined one to another at adjacent side locations and a base ARC unit.
Figure 6A:
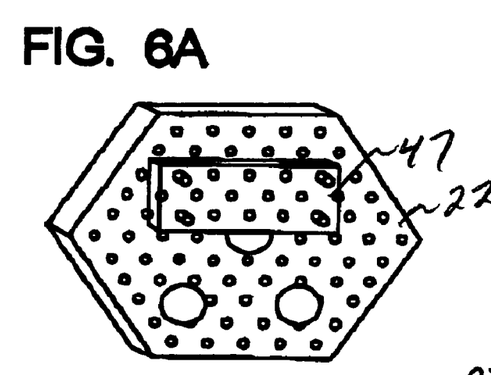
FIGS. 6A, 6B, 6C and 6D show various configurations of the tenants that are mounted to the ARC units.
Figure 6B:
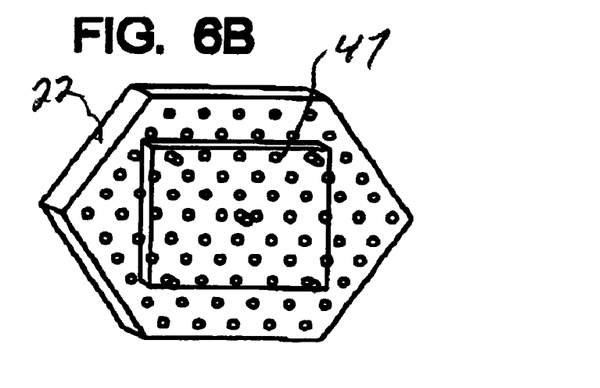
Figure 6C:
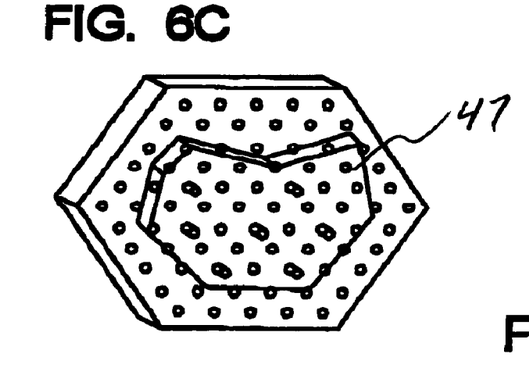
Figure 6D:
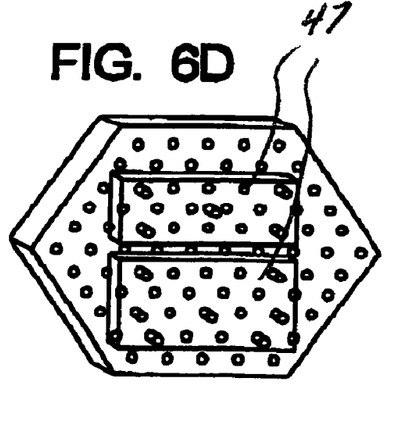

Reference is now made to FIG. 5 which shows the manner in which two of the ARC units 22 may be connected to one another at selected side surface interface regions. The connection is made by placing a side surface region of each of two ARC units 22 adjacent to one another and making a physical connection to hold the ARC units 22 together, and also making the functional connections at the power, data path, and thermal connections 38, 40 and 42 respectively. The manner of making the physical connection between the two ARC units 22 can be done in various ways that are known in the prior art, such as by a mechanical connection, a magnetic connection, etc. For example there could be latching devices, plug and socket connectors, electric powered magnets, etc. By making such connections between two ARC units 22, power, thermal and data transmissions between the ARC units 22 can be accomplished.

As indicated previously, various tenants can be mounted to each of the ARC units 22. These connections are arranged to provide both structural connection between the ARC unit and the tenant, as well as for power, data, and thermal transmission/receptions. Different tenant shapes and sizes can be accommodated by each ARC unit, and four of these tenants are illustrated at 47 in FIGS. 6A, 6B, 6C, and 6D. The top surface of each ARC unit 22 has an array of snap-on type connections either mechanical or non-mechanical to securely hold down the tenant, and surface to surface contact is able to provide thermal conduction. There are also fixed location insertion points for the tenant to connect to the power and data ports provided within the ARC unit 22.

Figure 7:
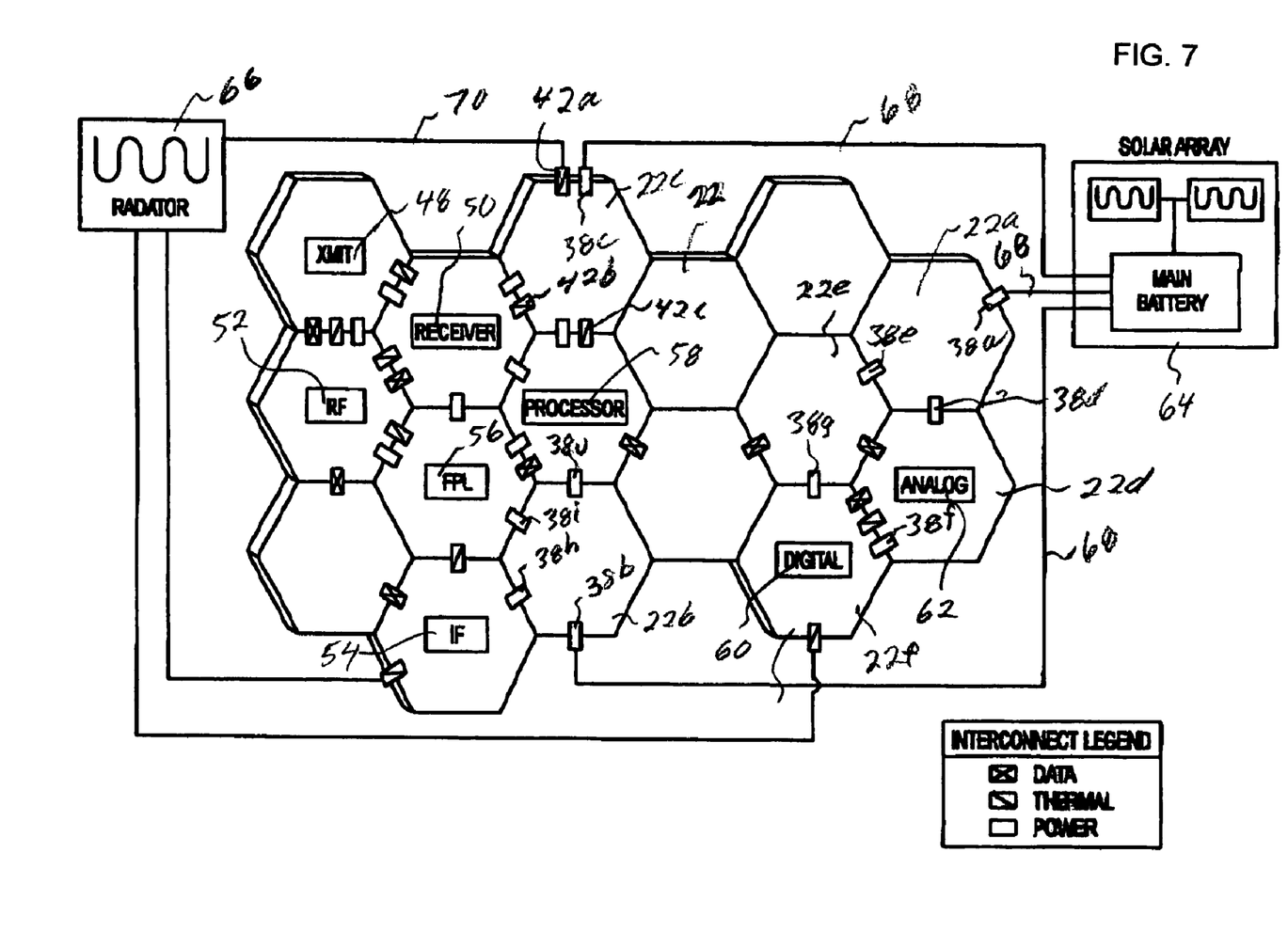
FIG. 7 is a schematic isometric view illustrating a group of the ARC units assembled in a ARC unit assembly and showing various links between the ARC units.

To illustrate how the various ARC units 22 and the tenants can be assembled in an operating system in an ARC unit assembly, reference is now made to FIG. 7. When ARC units 22 are used to build a satellite each of these tenants only needs to provide it's "core" functionalities. In FIG. 7 there are shown sixteen ARC units 22 that are connected to one another to form an ARC unit assembly 18. In addition to the ARC units 22, generic traditional satellite bus and payload systems can be added such as computer, sensor and communication equipment, etc. For example, a typical computer may be needed if the ARC unit embedded processor is not powerful enough to accomplish the processing function.

By way of further example and to describe the system in more detail, there is shown in FIG. 7 various operative connections between a number of adjacent ARC units 22. To identify which are power connections, thermal connections or data path connections, reference is made to the Interconnect Legend Box which is part of FIG. 7. In this legend box the power connection is shown by a small rectangle with no line extending through, the thermal connection is illustrated by a small rectangle with a single diagonal line across the rectangle; and the data flow connection is indicated by a small rectangle with two crossing diagonal lines therein. Also, the locations of eight tenants on eight of the ARC units 22 are identified, namely the transmitter tenant 48, receiver tenant 50, radio frequency tenant 52, intermediate frequency tenant 54, FPA (focal plane array), tenant 56, processor tenant 58, digital tenant 60 and analog tenant 62. Further, in FIG. 7 there is the power section 64, made up of the solar array panels and a main battery, and a radiator 66.

An examination of FIG. 7 reveals that there are three lines 68 that make direct connection from the power section 64 to three of the ARC units 22, identified as 22a, 22b, and 22c and these connections are identified as 38a, 38b, and 38c respectively. Then from the power connection 38a in the ARC unit 22a there are made through the ARC unit 22a two additional power connections at 38d and 38e, which connect to the ARC units 22d and 22e, respectively. The ARC unit 22d then has a power connection at 38f to the ARC unit 22f, and there is also another power connection at 38g going from the ARC unit 22e to the ARC unit 22f.

There is a somewhat similar pattern of power distribution from the power connection 38b at the ARC unit 22b and there are three additional power connections 38h, 38i, and 38j, these leading respectively to three other ARC units. It is readily apparent by examining FIG. 7 that the power distribution can be continued through various ARC units 22. It is also readily apparent that the same type of transmission through and between various ARC units 22 can be made through data path and thermal connections. For example, the radiator 66 makes a connection through a line 70 to a thermal connection 42a at ARC unit 22c, and this communicates through the ARC unit 22c through two other thermal connections at 42b and 42c to other ARC units 22, and from there to other ARC units 22.

The power connections which are indicated in FIG. 7 are those which are among those that would be actively operating so as to provide transmission/receiving functions and also to provide power, data and thermal control to the tenants 47 connected to the ARC units 22. It is to be understood, of course, in this particular embodiment each of the six side surfaces of each of the ARC units 22 has three of the functional connections, namely the power connection 38, the data path connection 40, and the thermal connection 42. Thus, there could be other connecting locations activated for various reasons.

For example, it may be that redundant paths are desired in a situation where one of the tenants has higher than usual power needs, and thus there could be redundant paths from the power source through several of the ARC units 22 in parallel so as to provide sufficient power. Also, the location of some of the tenants may be such that these will be placed on one of the ARC units 22 that is located more strategically relative to the type and/or magnitude of the task of providing the function. Thus, if one of the tenants is consuming a relatively large amount of power, thus generating more heat, it may well be placed on a particular ARC unit 22 that is strategically located relative to the radiator at which the heat is dissipated.

At the risk of being somewhat repetitious with earlier portions of this text it should be pointed out that there are a number of benefits which can be realized by incorporating this system. Through standardization, automation and economy of scale, cost and schedule savings are achieved through a number of ways. First, the same building block, i.e. the ARC unit 22, can be used in larger quantities for constructing satellites. Secondly, pre-certification of ARC units and standard interface to tenants reduces development, integration and test, and manufacturing time. Thirdly, tenants (i.e. payload and bus equipment, instrumentation, etc.) with reduced functionality requirements will cost less and weigh less. Fourth, system design eliminates duplicated functions and redundancies associated with tenants.

With ARC units being made available, a satellite could be built in a relatively short time, and on-orbit checkout hours would be substantially reduced, since each ARC unit contains embedded intelligence, is multi-functional, and is highly reconfigurable. Further, since the ARC units provides a basic housekeeping functions for all tenants, the cost of tenants will be reduced as well. With embedded intelligence, distributed satellite health management can be realized and used to facilitate integration and test, e.g. build a little and test a little, in addition to insure the robustness of the system.

For each class of satellites, different sizes of ARC units may exist. Satellites of any shape or any size can be built using ARC units and are adaptable to changing environment during manufacture, post manufacture, and post deployment to be responsive to environment, system and mission needs.

Figure 8A:
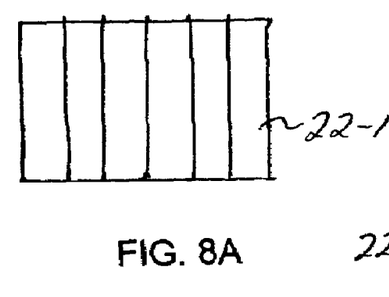
FIGS. 8A-8G are somewhat schematic plan views showing different configurations of the ARC units. More specifically, in FIG. 8A these are rectangular, in FIG. 8B a square configuration, in FIG. 8C in the form of an equilateral triangle, in FIG. 8D octagonal, in FIG. 8E a combination of a larger rectangle and smaller rectangles, in FIG. 8F arrange to form either a cylindrical or dome-like structure, and in FIG. 8G as rectangular members which are interconnected in a structure where the number of the components are spaced from one another.
Figure 8B:
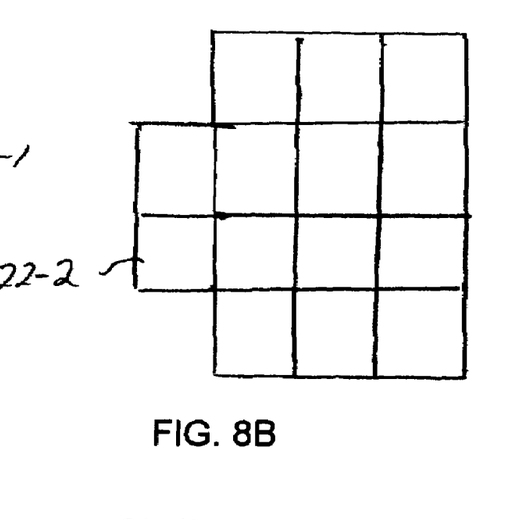

Also, the ARC units 22 could be made in a different geometric configurations. Various examples of this are given in FIGS. 8A through 8G. In FIG. 8A, there are shown six ARC units 22-1 that are joined to each other along their lengthwise surfaces. In FIG. 8B there are shown ARC units 22-2 which have square configurations.

Figure 8C:
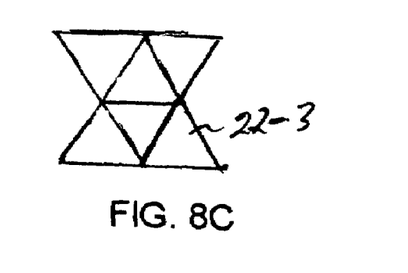

In FIG. 8C, the ARC units 22-3 each have the configuration of an equilateral triangle. Obviously, these could also be made in the form of Isosceles triangles, or even right angle triangles joined to one another.

Figure 8D:
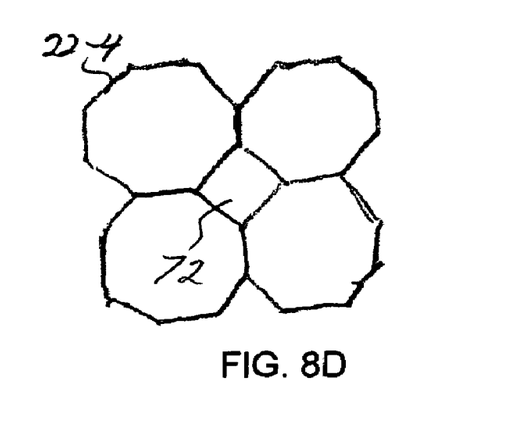
Figure 8E:
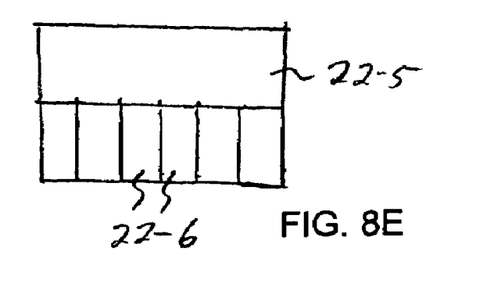

In FIG. 8D, the ARC units 22-4 are octagonal, and in the manner in which these are joined, there is a central area 72 which is open. This open space can be used for various purposes where access is needed from one location to another. In FIG. 8E, there is shown one relatively large structure 22-5 which could be, for example, an ARC unit having a larger configuration and a number of other rectangular ARC units 22-6 that are also rectangular, but of a smaller size.

Figure 8F:
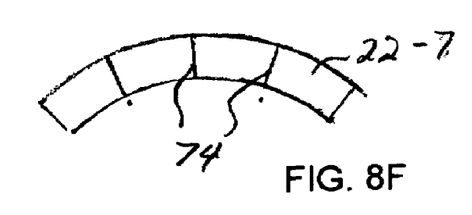

In FIG. 8F, there are shown four ARC units 22-7 which have a curved configuration which connects at radially aligned adjoining surfaces, so that these ARC units 22-7 can be joined in the form of a cylinder. This could be done, for example, to obtain a structural strength or in the overall design so that an area within the curved structure could be utilized in some manner. As an alternative, the slanted juncture surfaces 74 could be slanted toward a common center of a sphere so that when these are joined together, there could be a dome like structure.

Figure 8G:
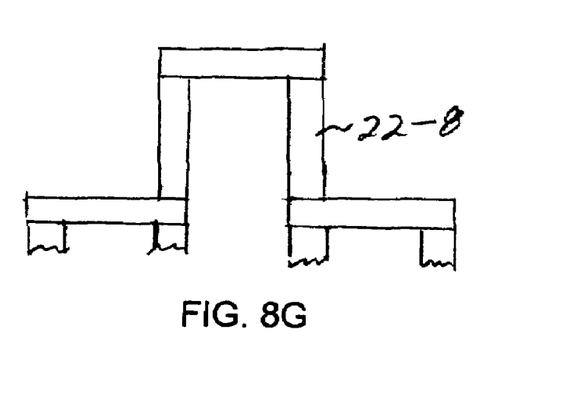

In FIG. 8G, the ARC units 22-8 are joined together in a structure that resembles a rectangular frame having between various components rectangular open spaces. This could be done, for example, when there are other components in the satellite which would desirably be positioned in these locations for various reasons. These spaces could be used for storage, or possibly the placement of components where close proximity to certain ARC unit 22-8 would be desirable.

Also, while this embodiment discloses only three basic functions being provided with each ARC unit 22, there could be additional functions that could be provided by the ARC units. For example, there may be a need for liquid or gaseous supply with fluid connections at the adjacent surfaces of adjacent ARC units, with conduits and switching capabilities.

Figure 9:
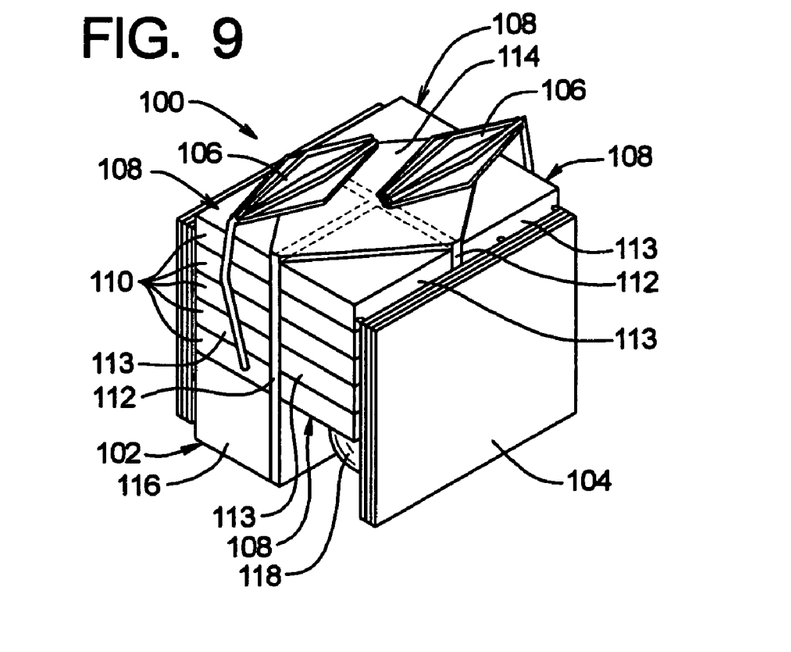
FIG. 9 is an isometric view showing a second embodiment of the present invention in its pre-launch stowed configuration.
Figure 10:
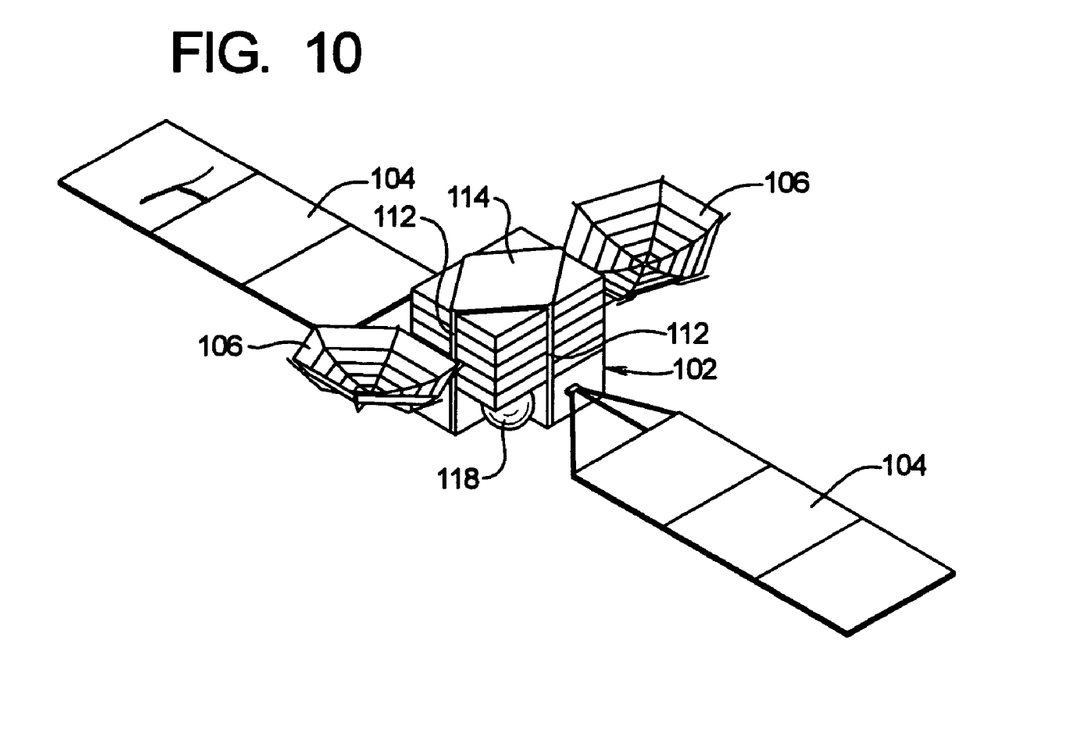
FIG. 10 is an isometric view showing the embodiment of FIG. 9 in its deployed position.

A further embodiment of the present invention will now be described with reference to FIGS. 9-13. With reference first to FIGS. 9 and 10, there is shown an ARC assembly 100, with this assembly 100 being shown in FIG. 9 in its stowed pre-launch configuration, and shown in FIG. 10 in a deployed configuration. This assembly 100 comprises a main central component 102, which is similar to the central component 12 of the first embodiment, oppositely positioned solar panels 104 (which can be the same as, or similar to, the solar panels 14 of the first embodiment), and also antennas 106.

In the stowed configuration of FIG. 9 the solar panels 104 are positioned against the main central component 102, and the antennas 106 are also in a stowed configuration over the top of the main central component 102. In the deployed position of FIG. 10, the solar panels are extended laterally outwardly (in a manner similar to the first embodiment when in the deployed position) and the antennas 106 are in an expanded configuration.

The main central component 102 comprises four sets 108 of ARC units 110. In this particular embodiment, there are in all twenty ARC units 110, five in each set 108 and the five ARC units 110 in each set are stacked one on top of the other. As shown herein, each of the ARC units 110 has an overall configuration of a rectangular prism which has an overall square configuration along its two major axes, and a thickness dimension substantially smaller then the two main axis.

The four stacks of (i.e. sets 108) of the ARC units 110 are aligned with one another in a square pattern so that in plan view the four stacks (or sets 108), spaced a short distance from each other, are seen as square quadrants in the overall larger square formed by the four sets 108 of ARC units 110.

There are four vertically aligned panels 112, which are positioned between the four spaces between the adjacent surfaces of the four sets 108 of ARC units 110. Thus, each of the panels 112 is vertically aligned (as seen in the view of FIGS. 9 and 10) and inner vertical edges of each panel 112 are adjacent to one another at a center location of the larger square formed by the ARC sets 108. The panels then extend outwardly from the center location at right angles from one another with the outer edges of each panel 112 being adjacent to outwardly facing side surfaces 113 of the four sets 108 of ARC units 110. In this configuration, the four panels 112 perform a structural function in that they connect to the twenty ARC units 110 to hold them in place.

In this arrangement there is an upper cover plate 114. As shown herein, this plate 114 has a square configuration and covers an area of one half of the larger square formed by the four sets 108, and is aligned so that the diagonal lines between the opposite corners of the square cover 124 are aligned with the upper edges of the four panels 112.

Obviously, other framework configurations could be utilized to perform the structural function of supporting the ARC units 110. Also as an of example of other options, there is positioned below the ARC units 110 additional components, such as a drawer 116 (shown in its closed position) and also a fuel tank 118. These two components 116 and 118 are simply given by way of example to indicate that the ARC units 110 and their associated panels 110 could be interconnected with other structural components and have other functional components as part of the overall apparatus.

Figure 11:
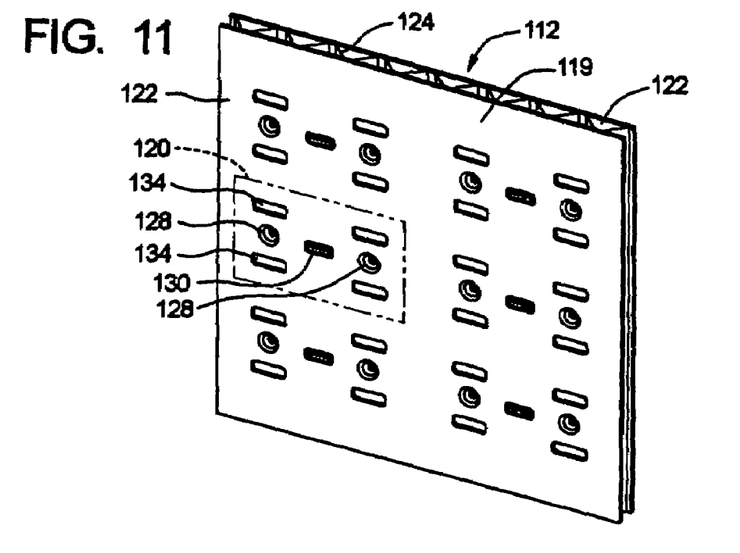
FIG. 11 is a isometric view showing one of the structural bus panels of the assembly of FIGS. 9 and 10.
Figure 12:
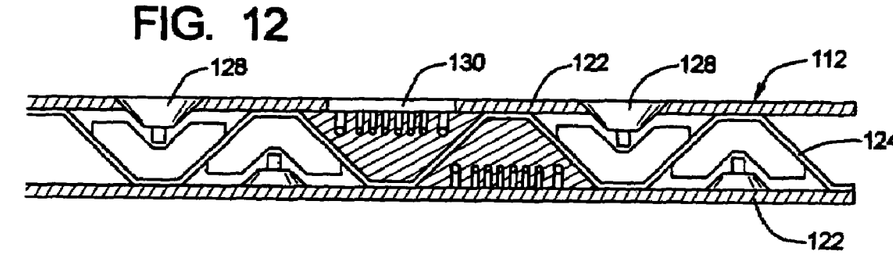
FIG. 12 is a sectional view taken through the bus panel of FIG. 11.
Figure 13:
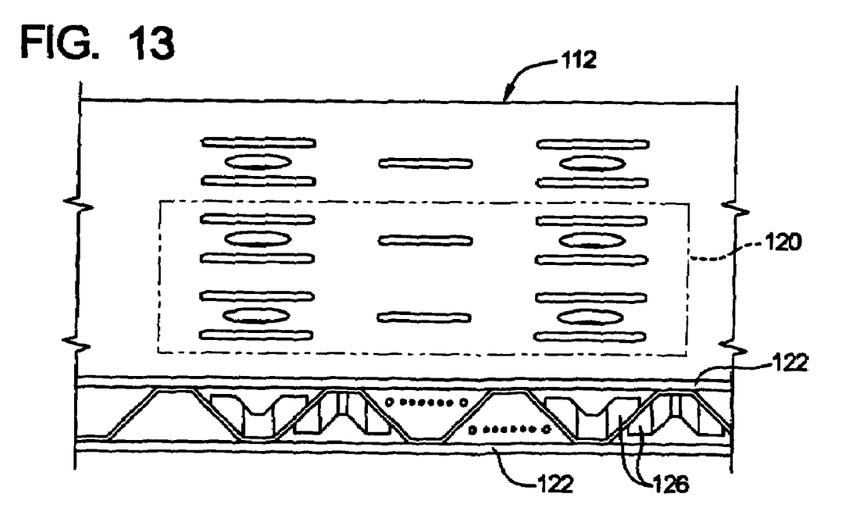
FIG. 13 is a partial isometric view of a portion ARC mounting area of the bus panel in FIG. 12.

In this embodiment, the panels 112, in addition to acting as a structure, also are arranged to be bus panels which provide functional connections with the ARC units 110 with regard to the thermal, data and power conduits and connections. To describe this further reference is made to FIGS. 11, 12 and 13 which show one possible form of the basic construction of one of the panels 112. The particular panel 112 shown in FIGS. 11-13 is not shown as being structured to fit the precise arrangement shown in FIGS. 9 and 10, but rather to illustrate one possible form of its basic configuration. For example, in FIGS. 11 and 12, there is indicated in a rectangle a single ARC mounting surface region 119, and it can be seen that there are six such mounting areas 120 in the region 119 of that one panel 112.

Each panel 112 has length and width dimensions substantially greater than the thickness dimension, and comprise two side plates 122 each having a rectangular configuration with the two side plates spaced a short distance from one another. The two side plates 122 are rigidly interconnected by suitable connecting structure 124 which FIG. 12 in this embodiment is shown as a continuous corrugated type structure 124, desirably made of aluminum for better thermal conductivity. In FIG. 13, there is shown another type of connecting structure made up of aluminum spacers 126, and these have their planar portions aligned perpendicular to the planes occupied by the two side plates 122 for structural strength, and are configured in a manner similar to honeycomb structure or other such structures that are common in the aerospace industry.

In this particular arrangement, the panel 112 has in each of the ARC mounting areas 120 shown in FIG. 11 two thermal interfaces 128 (connections) and one tooth style connection 130 which would serve as either power or data connections, and four mechanical connections 134 that could serve structural functions and other functions. As can be seen in FIG. 12, these connections 128 and 130 are on both sides of the bus panel 112 so that functional connections can be made to the ARC units 110 that are on opposite sides of the panel. These panels 112 may be made with additional functions, and could be made to provide switching functions and also processing functions to affect the thermal, data and power transmissions between the ARC units 110.

It is obvious that various modifications in the embodiments of the present invention and also additional embodiments could be made without departing from the basic teachings of the present invention.

Therefore we claim:

1. An operating assembly, comprising: a) a plurality of modular units, each of which comprises a plurality of interface surface regions, said modular units being arranged to be interconnected to form at least part of said assembly; b) at least some of said modular units being configured so as to be able to be located in said assembly in different position locations relative to each other in said assembly; c) at least some of said modular units having one or more interface connecting locations at one or more of their interface surface regions for one or more of a power connection, a thermal connection and data path connection, and having one or more of power, thermal and data transmission paths; d) one or more of said modular units having a switching system to selectively transmit and/or receive one or more of power, thermal and data transmissions; and e) one or more of the said modular units being arranged to have a tenant connection for at least one tenant being operatively connected thereto in a manner that one or more power, thermal, and data related functions can be provided for the tenant, wherein at least one or more of said modular units comprises a control section to control said switching system.

2. The assembly as recited in claim 1, when said one or more power, thermal and data transmission path is or are embedded in at least some of said modular units.

3. The assembly as recited in claim 1, wherein one or more of said modular units comprise a processor and the control section having one or more of light, thermal, vibration, radiation, pressure and stress sensors having an operative connection or connections to said processor and to said control section.

4. The assembly as recited in claim 1, wherein one or more of said modular units comprises a structural unit, and a plurality of said structural units are able to be connected to one another to form a structure assembly made up of said modular units.

5. The assembly as recited in claim 4, wherein at least some of said modular units are arranged so that interface surface regions of said modular units are able to come into a structural connecting relationship with one another to form at least part of said structure assembly.

6. The assembly as recited in claim 4, wherein at least some of said modular units have interface surface regions thereof arranged so that interface surface regions are able to come into an operative structural relationship to one another so as to form a structural interface, and there is also at said interface surface regions one or more of said power connection, thermal connection and/or data path connection so that both structural connection and one or more of said power connection, thermal connection, and data path transmission can be made through said interface regions.

7. The assembly as recited in claim 1, wherein at least some of said modular units comprise a plurality of structural subsections which have planform configurations which match one another sufficiently so that these can be stacked one on top of another, with one or more of said subsections being one or more of a power related subsection, a thermal related subsection, and a path related subsection.

8. The assembly as recited in claim 1, wherein at least some of said modular units each have at least part of their perimeter comprising a configuration of sides of a polygon, with one or more of the sides of the polygon comprising said interface surface regions.

9. The assembly as recited in claim 8, wherein at least some of said modular units comprise a regular polygon having side size of substantially the same length, with adjacent sides forming substantially identical angles.

10. The assembly as recited in claim 1, wherein there is at least one connecting structure which interconnects with interface surface regions of at least two of said modular units to enable interface connections to be made between at least two of said modular units to provide interconnection for at least one or more of power, thermal and data transmission paths.

11. The assembly as recited in claim 10, wherein said connecting structure provides connecting paths through said connecting structure for one or more of said power, thermal and data transmission paths.

12. The assembly as recited in claim 11, wherein said connecting structure has two oppositely positioned surface portions to provide connections for one or more of said modular units at one surface portion of the connecting structure to another one or more of said modular units at the opposite surface portion of the connecting structure.

13. The assembly as recited in claim 12, wherein there is a plurality of modular units connecting to the one side of the connecting structure and a second plurality of modular units connected to the second side of the connecting structure, with said connecting structure providing operative connections for one or more of said power, thermal and data transmission paths through said connecting structure from one or more of said modular units of said first plurality of modular units to one or more of the modular units of the second plurality of modular units.

14. The assembly as recited in claim 1, wherein said modular units have a more compact stowed configuration in which the modular units are stacked in one or more stacked configurations, and a deployed position where said modular units extend over a greater area in operative engagement with one another.

15. The assembly as recited in claim 14, wherein said assembly comprises at least a portion of a spacecraft, wherein the more compact stowed configuration may be utilized for storage and/or launching, and the deployed position can be utilized when in its operative location in a space environment.

16. The assembly as recited in claim 1, wherein said modular units are arranged to be connected to one another in a manner that one or more of power, thermal and data transmissions is or are able to be transmitted from a first modular unit through a second modular unit to a third modular unit or can be transmitted from a first modular unit through both of said second modular unit and third modular unit in parallel.

17. The assembly as recited in claim 1, wherein there is one or more of a power source, thermal control source, and data source, that is or are connected to a plurality of at least some of said modular units and have connections to at least one of said modular units to transmit through one of said modular units to at least two other modular units, either in series, or in parallel.

18. A modular unit which comprises: a) a plurality of interface surface regions, said modular unit being arranged to be interconnected to one or more other modular units to form at least part of an assembly;

b) said modular unit being configured so as to be able to be located in an assembly configuration in an operating position in different position locations in said assembly configuration;

c) said modular unit having one or more interface connecting locations at one or more of its interface surface regions for one or more of a power connection, a thermal connection and data path connection, and having one or more of power, thermal and data transmission paths;

d) said modular unit having a switching system to selectively transmit and/or receive one or more of power, thermal and data transmissions in an assembly configuration; and e) said modular unit being arranged to have a tenant connection for at least one tenant being operatively connected thereto in a manner that one or more power, thermal, and data related functions can be provided for the tenant, wherein said modular unit comprises a control section to control said switching system.

19. A method of providing one or more tenants with one or more of power, data and thermal related transmissions by means of an operating assembly, said method comprising:

a) providing a plurality of modular units, each of which comprises a plurality of interface surface regions, said modular units being arranged to be interconnected to form at least part of said assembly with at least some of said modular units being configured so as to be able to be located in said assembly in different position locations relative to each other in said assembly;

b) operatively connecting at least some of said modular units to one another, so that one or more interface connecting locations of said some of said modular units at one or more of their interface surface regions are able to provide one or more of power connections, thermal connections and data path connections, for one or more of power, thermal and data transmission paths;

c) providing one or more of said modular units with a switching system controlled by a control section of at least one or more of the modular units to at least one of selectively transmit and receive one or more power, thermal and data transmissions; and d) connecting one or more tenants to one or more of said modular units in a manner that one or more of power, thermal and data related functions can be provided for the tenant.

* * * * *